(12) United States Patent
Doyle et al.

(10) Patent No.: US 7,287,179 B2
(45) Date of Patent: Oct. 23, 2007

(54) AUTONOMIC FAILOVER OF GRID-BASED SERVICES

(75) Inventors: Ronald P. Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 10/438,434

(22) Filed: May 15, 2003

(65) Prior Publication Data

US 2004/0243915 A1 Dec. 2, 2004

(51) Int. Cl.
*G06F 11/00* (2006.01)
(52) U.S. Cl. .............................. 714/4; 714/13; 709/226
(58) Field of Classification Search .................... 714/4, 714/13; 709/226, 229
See application file for complete search history.

(56) References Cited

U.S. PATENT DOCUMENTS

| | | | | |
|---|---|---|---|---|
| 5,748,882 | A * | 5/1998 | Huang | 714/47 |
| 5,805,785 | A * | 9/1998 | Dias et al. | 714/4 |
| 5,938,732 | A * | 8/1999 | Lim et al. | 709/229 |
| 6,195,760 | B1 * | 2/2001 | Chung et al. | 714/4 |
| 6,922,791 | B2 * | 7/2005 | Mashayekhi et al. | 714/4 |
| 6,982,951 | B2 * | 1/2006 | Doverspike et al. | 370/217 |
| 2003/0014507 | A1 | 1/2003 | Bertram et al. | |
| 2003/0036886 | A1 | 2/2003 | Stone | |
| 2003/0142627 | A1 * | 7/2003 | Chiu et al. | 370/238 |
| 2004/0019624 | A1 * | 1/2004 | Sukegawa | 709/201 |
| 2004/0139202 | A1 * | 7/2004 | Talwar et al | 709/229 |
| 2005/0021594 | A1 * | 1/2005 | Bernardin et al. | 709/200 |
| 2005/0055322 | A1 * | 3/2005 | Masters et al. | 707/1 |
| 2005/0283788 | A1 * | 12/2005 | Bigagli et al. | 719/318 |

FOREIGN PATENT DOCUMENTS

WO WO9722054 A2 6/1997

OTHER PUBLICATIONS

P. Stelling et al, "A Fault Detection Service for Wide Area Distributed Computations,"Proceedings of the Seventh IEEE International Symposium on High Performance Distributed Computing, Aug. 1998.*

(Continued)

*Primary Examiner*—Robert Beausoliel
*Assistant Examiner*—Philip Guyton
(74) *Attorney, Agent, or Firm*—Jeanine Ray-Yarletts, Esq.; Steven M. Greenberg, Esq,; Carey Rodriguez Greenberg & Paul LLP

(57) ABSTRACT

A grid coordinator which has been configured for autonomic failover can include a monitor communicatively linked to a multiplicity of grid hosts in a services grid. A metrics store can be coupled to the monitor and configured to store service metrics for individual service instances in the grid hosts. Optimization logic can be programmed to compute a best-fit between metrics stored for a set of service instances in a failed grid host, and platform metrics determined for a proposed replacement grid host. Finally, a failover processor can be coupled to the monitor and the optimization logic and communicatively linked to the grid hosts to create a new set of service instances in the proposed replacement grid host to replace the set of service instances in the failed grid host according to the best-fit in the optimization logic.

16 Claims, 3 Drawing Sheets

OTHER PUBLICATIONS

A. Waheed et al, "An Infrastructure for Monitoring and Management in Computational Grids." In Proceedings of the 5th Workshop on Languages, Compilers, and Run-time Systems for Scalable Computers. Mar. 2000.*

S. Hwang, et al, "GridWorkflow: A Flexible Failure Handling Framework for the Grid," hpdc, 12th IEEE International Symposium on High Performance Distributed Computing (HPDC-12 '03), 2003.*

R. Medeiros, et al, "Faults in Grids: Why are they so bad and What can be done about it?," grid, Fourth International Workshop on Grid Computing, 2003.*

G. Kola, et al, "Phoenix: Making Data-Intensive Grid Applications Fault-Tolerant," grid, pp. 251-258, Fifth IEEE/ACM International Workshop on Grid Computing (GRID'04), 2004.*

I. Foster, et al., *Grid Services for Distributed System Integration*, *Computer*, pp. 37-46, (Jun. 2002).

J. Ingalls, *Grid Computing—A Technology/Market Overview*, *Intel Developer Services*, <http://cedar.intel.com/cgi-bin/ids.dll/content/printable.jsp>, (viewed Apr. 17, 2003).

I. Foster, *Internet Computing and the Emerging Grid*, *Nature Web Matters*, <http://www.nature.com/nature/webmatters/grid/grid.html>, (Dec. 7, 2000).

P. Shread, *Grid Services Gains Momentum*, *Grid Computing Planet*, <http://www.gridcomputingplanet.com/news/print.php/11171_1438871>, (Aug. 2, 2002).

P. Shread, *Core Grid Services Specification*, <http://www.internetnews.com/intra/print.php/2108161>, (Mar. 11, 2003).

"The Anatomy of the Grid: Enabling Scalable Virtual Organizations", Cluster Computing and the Grid, 2001. Proceedings. First IEEE/ACM International Symposium on May 15-18, 2001, Piscataway, NJ, USA, IEEE, May 15, 2001, pp. 6-7, XP0105542626—the whole document.

Cubera F, et al: "Unraveling the Web Services Web: An Introduction to SOAP, WSDL, and UDDI" IEEE Internet Computing, IEEE Service Center, Piscataway, NJ, US, vol. 6, No. 2, 2002, pp. 86-93, XP002257200—the whole document.

* cited by examiner

AUTONOMIC FAILOVER OF GRID-BASED SERVICES

BACKGROUND OF THE INVENTION

1. Statement of the Technical Field

The present invention relates to the field of distributed computing, including Web services and grid services, and more particularly to grid service failover.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories, and discovery protocols alone are not suitable for distributed interoperability. Rather, a more structured, formalized mechanism can be necessary to facilitate the distribution of Web services in the formation of a unified application.

Notably, the physiology of a grid mechanism through the Open Grid Services Architecture (OGSA) can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided—even across organizational domains.

Within the services grid, a service providing infrastructure can provide processing resources for hosting the execution of distributed services such as grid services. The service providing infrastructure can include a set of resources, including server computing devices, storage systems, including direct attached storage, network attached storage and storage area networks, processing and communications bandwidth, and the like. Individual transactions processed within the service providing infrastructure can consume a different mix of these resources.

Notably, the OGSA defines an architecture in which service instances can be deployed to one or more varying locations within the services grid. Correspondingly, client requests to access an instance of a specific service can be routed to what is considered to be the most optimal instance of the specific service for the request. To that end, individual service instances can be replicated to different nodes in the services grid in a strategic manner based upon optimization criteria. The optimization criteria typically can resolve to nodes having access to specific resources, nodes having service instances which have been co-located with other important service instances, locality with respect to a particular client, and the like.

When a service instance or a node hosting a service instance in the services grid fails, for whatever reason, a failover strategy can become a critical aspect of the operation of the services grid. In this regard, it can be imperative that when a failure has been detected in a node or service instance in the services grid, that subsequent requests to access service functions within service instances in the failed node are re-routed elsewhere in the services grid to other instances of the desired service. Importantly, such re-routing must occur transparently so as to not disturb the virtual organization aspect of the services grid. Still, while failover re-routing is known in the art, little attention has been paid to the re-deployment of a failed service instance in the services grid.

SUMMARY OF THE INVENTION

The present invention is a system, method and apparatus configured to manage autonomic failover in the context of distributed Web services. A method for autonomic failover can include collecting metrics for service instances in a node and detecting a failure in the node. Upon detecting the failure, a set of replacement nodes can be located and platform metrics can be determined for each of the replacement nodes. Consequently, new replacement service instances can be created in optimally selected ones of the replacement nodes based upon the collected metrics and the platform metrics. In this regard, a best-fit analysis can be performed between the collected metrics and the platform metrics to identify an optimal replacement node in which to create new replacement service instances.

In some circumstances, it is perceived that a single replacement node will be able to host the newly created replacement service instances in a manner not likely to result in a degradation of performance in any one of the service instances. Yet, in many other circumstances a more complex rearrangement of new and pre-existing service instances will be required across multiple replacement nodes. In this regard, the creating step can include additionally collecting metrics for existing service instances in an optimal replacement node. A best-fit analysis can be performed between both of the collected and additionally collected metrics and platform metrics for the optimal replacement node. Subsequently, a set of new replacement service instances can be created in the optimal replacement node to co-exist with a portion of the existing service instances in which the set of new replacement service instances and the portion of the existing services instances are computed to be optimally combined in the optimal replacement node. By comparison, others of the existing service instances can be displaced to other replacement nodes and a remaining set of new replacement service instances can be created in the other replacement nodes.

In a preferred aspect of the invention, the metrics can include at least one metric selected from the group consisting of resources consumed in a grid host, a preferred operating system platform, minimum resources required in a grid host, preferred resources available for consumption in a grid host. Additionally, in a yet further preferred aspect of the invention, the metrics can include at least one additional metric selected from the group consisting of a cost per unit of performance, a cost per unit of resource consumption, revenue per unit of performance, and revenue per unit of resource consumption. Accordingly, the best-fit analysis can be performed between both of the collected and additionally collected metrics and platform metrics for the optimal replacement node, while weighting at least one metric selected from the group consisting of a cost per unit of performance, a cost per unit of resource consumption, revenue per unit of performance, and revenue per unit of resource consumption.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for managing autonomic failover in a services infrastructure, such as a Web services or grid services hosting infrastructure. In reference specifically to a grid services hosting infrastructure, a grid hosting node which has failed can be detected and a corresponding set of grid services hosted in the failed node can be determined. Computing requirements, computing performance and cost/revenue characteristics can be determined for each service in the corresponding set. Moreover, existing grid services host nodes can be identified which can accommodate new instances of the grid services in the corresponding set. Where a host node can be identified which can accommodate all of the services in the corresponding set, the services in the set can be instantiated in the identified host node. Otherwise, the placement of the services in one or more host nodes can be optimized according to one or several of the determined computing requirements, performance and cost/revenue characteristics.

In this regard, each service instance can be monitored for computing requirements, performance metrics and cost/revenue characteristics. As an example, computing requirements can include operating system requirements and hardware resource requirements. Performance metrics, by comparison, can include resource consumption metrics such as communications bandwidth, processor, memory or disk storage consumed in the course of the operation of the service instance. Finally, cost/revenue characteristics can include both the cost per resources consumed, and the revenues per resources consumed, for example. In all cases, the metrics can be logged dynamically during the operation of each service. Thus, it is expected that the metrics will change over time.

Responsive to detecting a node failure, higher priority services can be placed in a node where such higher priority services can enjoy a resource consumption level that meets or exceeds previous levels in the failed node. In a limited resource context, however, where a replacement node lacks enough resources to accommodate new instances of all of the services in the failed nodes at their previous resource consumption levels, lower priority services can be allocated even less resources than had previously been the case in the failed node. To avoid this circumstance, multiple replacement nodes can be used to host new instances of the services where an performance impact resulting from the unbundling of the services in the set does not outweigh the performance impact from allocating lower resource levels in a replacement node for lower priority services.

Figure 1:
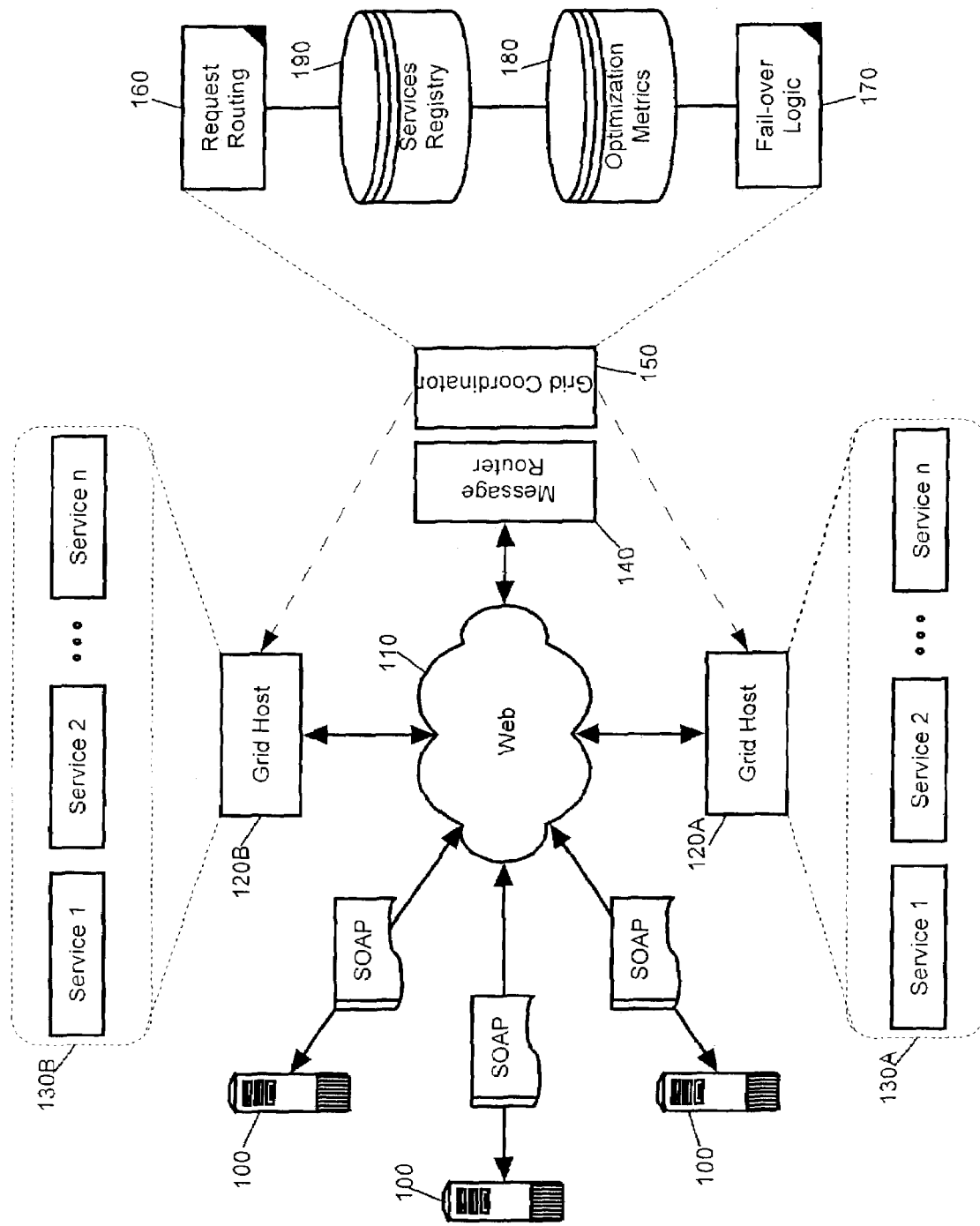
FIG. 1 is a schematic illustration of a services grid configured for autonomic failover in accordance with the present invention.

In any case, while the invention can be implemented in the context of a distributed set of Web services, or in the more particular case of a grid services infrastructure, in a preferred aspect of the invention, a grid services infrastructure is configured for autonomic failover as described herein. To that end, FIG. 1 is a schematic illustration of a services grid configured for autonomic failover in accordance with the present invention. As will be apparent to the skilled artisan, the services grid can be a Web services grid configured with one or more grid hosts 120A, 120B communicatively linked to one another in a grid fashion across a computer communications network 110, for instance the Internet. Individual requesting clients 100 can request access to Web services from one or more of the grid hosts 120A, 120B. Specifically, as is well-known in the art, SOAP encoded messages can be routed between requesting clients 100 and grid services 130A, 130B residing in respective grid hosts 120A, 120B.

In particular, clients 100 can request access to individual Web services by requesting as much from a grid coordinator 150. More specifically, SOAP encoded messages can be received in a message router 140 which messages can be selectively routed to one of a known set of grid coordinators 150 (only one shown). For each message received, the grid coordinator 150 can locate a desired instance of the requested Web service in the services grid by consulting a services registry 190 of known grid services 130A, 130B, hosted within known grid hosts 120A, 120B. Subsequently, request routing logic 160 in the grid service coordinator 150 can route the request to a selected one of the grid services 130A, 130B in a respective one of the grid hosts 120A, 120B.

It will be recognized by the skilled artisan that the grid hosts 120A, 120B can be disposed within a server computing device in a centralized fashion, or across multiple server computing devices in a distributed fashion. The grid hosts 120A, 120B can include a physical host such as a computing device, or a virtual host, such as a virtual machine or process within a physical host. In either case, typically each of the grid hosts 120A, 120B can be viewed as a host node in which Web services can be instantiated, maintained and destroyed.

Importantly, the grid services coordinator 150 can implement a grid services interface such as that defined by OGSA and specified, for example, according to the Globus Project, *Globus Toolkit Futures: An Open Grid Services Architecture*, Globus Tutorial, Argonne National Laboratory (Jan. 29, 2002). As is well-known in the art, an OGSA compliant grid services interface can include the following interfaces and behaviors:

1. Web service creation (Factory)
2. Global naming (Grid Service Handle) and references (Grid Service Reference)
3. Lifetime management
4. Registration and discovery
5. Authorization
6. Notification
7. Concurrency
8. Manageability In that regard, the grid services coordinator 150 can include a factory interface able to clone instances of selected Web services into new or pre-existing application containers using a "Factory Create Service".

Significantly, the grid services coordinator 150 can request the instantiation of grid service instances 130A, 130B of a requested Web service across one or more of the remote grid hosts 120A, 120B. Consequently, responsive to receiving service requests for processing in a specified Web service, regardless of any particular instance of the specified Web service, a request routing logic 160 in the grid services coordinator 150 can select a specific one of the service instances 130A, 130B within the grid hosts 120A, 120B to handle the service request according to any number routing criteria.

In accordance with the present invention, both failover logic 170 and a store of optimization metrics 180 can be included with the grid coordinator 150, either wholly or by association. The optimization metrics 180 can include a listing of various static and dynamic parameters and measurements associated with the operation of the individual service instances 130A, 130B. In this regard, the optimization metrics 180 can include a measurement of the resources consumed in a grid host 120A, 120B, a preferred operating system platform, minimum resources required, and preferred resources required. Moreover, the optimization metrics 180 can specify for each individual service instance 130A, 130B a cost per unit of performance, a cost per unit of resource consumption, revenue per unit of performance, and revenue per unit of resource consumption. Notably, the data included in the store of optimization metrics 180 can be updated regularly by operation of a monitor (not shown) coupled to the store of optimization metrics 180 which can collect performance data for the individual service instances 130A, 130B.

As the circumstance will arise, the failover logic 170 can detect a failing one of the grid hosts 120A, 120B in which one or more service instances reside. Recognizing a failing grid host, the failover logic 170 can locate one or more replacement grid hosts. The replacement grid hosts can include grid hosts able to accommodate all service instances within the failing grid host. Conversely, the replacement grid hosts can include grid hosts already hosting service instances and having less than all host resources presently allocated for the use of the service instances in the failing grid host. In the case where a near identical or identical replacement grid host can be identified, new instances of the service instances residing in the failing grid host can be created in the identified replacement host. Otherwise, a process for failover optimization can be performed in order to optimally place new instances of the service instance residing in the failing grid host.

Figure 2:
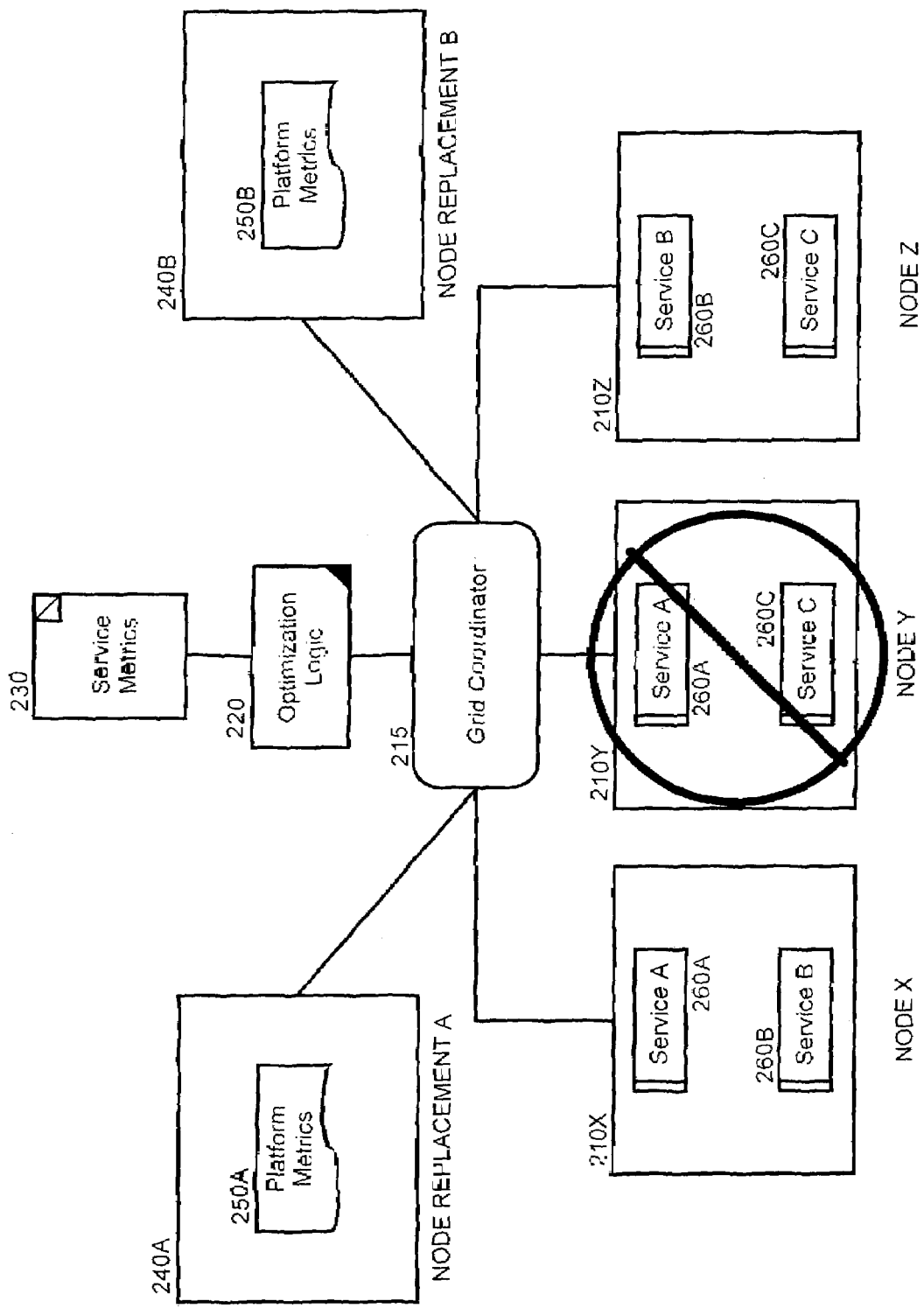
FIG. 2 is a block illustration of a process for failover optimization in the services grid of FIG. 1; and, FIG. 3 is a flow chart illustrating a process for managing autonomic failover in the services grid of FIG. 1.

FIG. 2 is a block illustration of a process for failover optimization in the services grid of FIG. 1. In accordance with the inventive arrangements, a grid coordinator 215 can monitor the operation of individual service instances 260A, 260B, 260C operating in selected nodes 210X, 210Y, 210Z. During the course of monitoring the individual service instances 260A, 260B, 260C, service metrics 230 can be logged for each individual one of the service instances 260A, 260B, 260C. More specifically, each one of the service instances 260A, 260B, 260C can be monitored for computing requirements, performance metrics and cost/revenue characteristics. As an example, computing requirements can include operating system requirements and hardware resource requirements. Performance metrics, by comparison, can include resource consumption metrics such as communications bandwidth, processor, memory or disk storage consumed in the course of the operation of the service instance. Finally, cost/revenue characteristics can include both the cost per resources consumed, and the revenues per resources consumed, for example.

Upon detecting a failure in a particular monitored node, for instance node 210Y in which service instances 260A, 260C reside, optimization logic 220 can attempt failover in accordance with the following process. First, one or more replacement nodes 240A, 240B can be identified. Individual platform metrics 250A, 250B can be determined for each respective replacement node 240A, 240B. The individual platform metrics 250A, 250B can include, for instance, computing configuration data such as processor type, operating system type, memory and storage quantities, and the like. The individual platform metrics 250A, 250B further can include a dynamically specified state of the replacement node 250A, 250B, such as computing resources consumed, number and identity of service instances hosted, to name a few.

In exemplary case of FIG. 2, the optimization logic 220 initially can determine whether services 260A, 260C hosted within the failed node 210Y can be wholly re-instantiated in one of the identified replacement nodes 240A, 240B in a manner in which the services 260A, 260C can continue to operate at a performance level previously attained in the failed node 210Y. In this regard, as a simple case, where replacement node 240A has been determined to include computing resources able to accommodate new instances of the services 260A, 260C at a level of performance previously attained in the failed node 210Y, new instances of the services 260A, 260C can be placed within the replacement node 240A.

In contrast, where neither of the replacement nodes 240A, 240B can accommodate new instances of the services 260A, 260C at a level of performance previously attained in the failed node 210Y, new instances of the services 260A, 260C can be placed across one or more of the replacement nodes 240A, 240B in an optimal fashion based upon the service metrics 230 for the instances of the services 260A, 260C. More specifically, new instances of the services 260A, 260C can be placed across both replacement nodes 240A, 240B so that any one replacement node 240A, 240B need not accommodate both of the new instances of the services 260A, 260C. Alternatively, the service metrics 230 for the instances of the services 260A, 260C can be matched to the platform metrics 250A, 250B to identify a most compatible platform for any one of the instances of the services 260A, 260C. For example, a preferred operating system can be determinative in this regard.

In a preferred aspect of the invention, cost-to-performance and revenue-to-performance ratios can be determined for each instance of the services 260A, 260C. In this way, the placement of new instances of the services 260A, 260C can be placed within one or more of the replacement nodes 240A, 240B in a manner so as to optimize the likelihood that instances of the services 260A, 260C enjoying higher revenue/performance and lower cost/performance ratios will be more likely to attain higher performance within the replacement node, while instances of the services 260A, 260C having lower revenue/performance and higher cost/performance ratios will yield to the former instances of the services 260A, 260C. To assist in the foregoing computation, a best-fit analysis can be applied to the service metrics 230 and platform metrics 250A, 250B.

Figure 3:
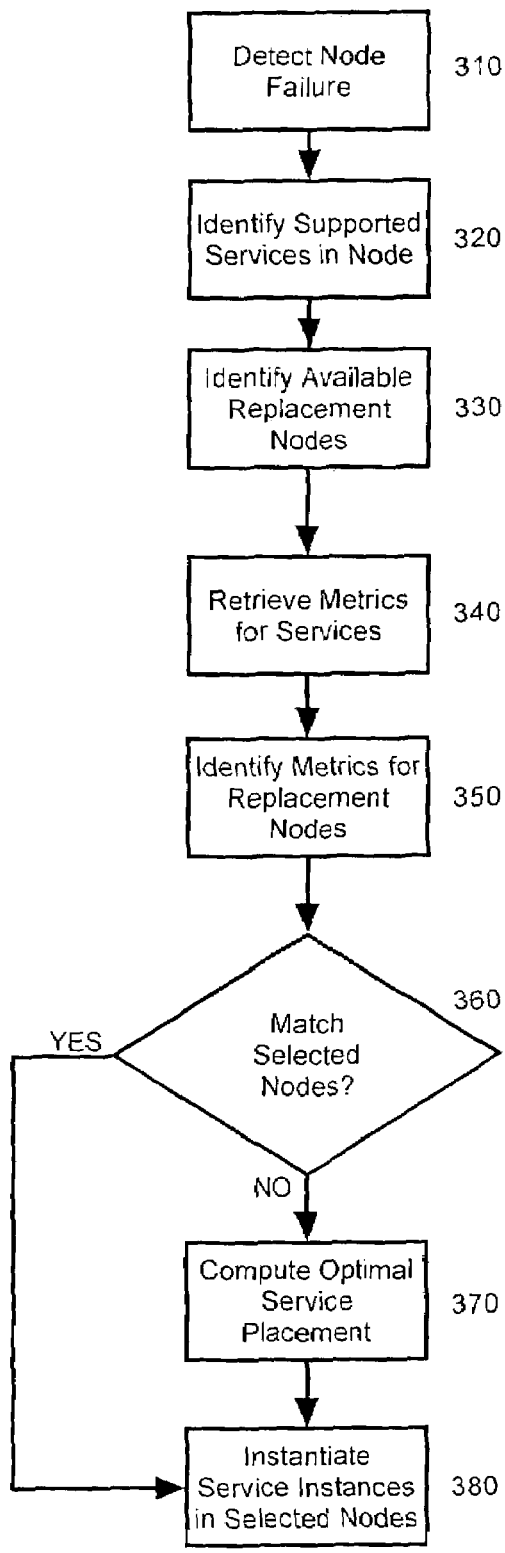

FIG. 3 is a flow chart illustrating a process for managing autonomic failover in the services grid of FIG. 1. Beginning in block 310, a node failure can be detected within the grid coordinator. In block 320, each service instance residing within the failed node can be identified. In block 330, one or more replacement nodes can be further identified. In block 340, the logged metrics for each of the service instances in the failed node can be retrieved. Alternatively, for each instance of a service hosted in the failed node, logged metrics for multiple instances across other nodes for the service can be retrieved so as to smooth anomalous events in any one instance fo the service. In any case, platform metrics for each of the identified replacement nodes can be identified in block 350.

In decision block 360, it can be determined whether any of the identified replacement nodes can accommodate new instances of the services without requiring a reduction in performance based upon a previously experienced performance in the failed node. If so, in block 380, new instances of the services can be placed within the identified replacement node able to accommodate new instances of the services without requiring a performance reduction. Otherwise, in block 370 an optimal service placement analysis can be performed. More particularly, the metrics for each service can be retrieved and compared to the metrics for each potential replacement node.

A best-fit analysis can be applied to determine in which replacement nodes new instances of the services ought to be created. Notably, different elements of the service metrics can be weighted to emphasize certain elements over others, e.g. revenue per percentage of resource consumption is more important than preferred operating system. In consequence, the entirety of the new service instances can be created in a replacement node to the detriment of one or more of the new service instances, or the entirety of the new service instances can be fragmented across multiple replacement nodes to ensure no degradation in performance in any one new service instance. Finally, the analysis of block 370 can be extended to pre-existing service instances within one or more of the replacement nodes where it is foreseeable that any one fo the pre-existing service instances might become displaced through the placement of new services in the replacement nodes.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for autonomic failover comprising the steps of:
   collecting metrics for service instances in a node;
   detecting a failure in said node;
   upon detecting said failure, locating a set of replacement nodes and determining platform metrics for each of said replacement nodes; and,
   creating new replacement service instances in selected ones of said replacement nodes based upon said collected metrics and said platform metrics.

2. The method of claim 1, wherein said metrics comprise at least one metric selected from the group consisting of resources consumed in a grid host, a preferred operating system platform, minimum resources required in a grid host, preferred resources available for consumption in a grid host.

3. The method of claim 2, wherein said metrics further comprise at least one metric selected from the group consisting of a cost per unit of performance, a cost per unit of resource consumption, revenue per unit of performance, and revenue per unit of resource consumption.

4. The method of claim 1, wherein said creating step comprises the steps of:

performing a best-fit analysis between said collected metrics and said platform metrics to identify a replacement node in which to create new replacement service instances; and, creating new replacement service instances in said identified replacement node.

5. The method of claim 1, wherein said creating step comprises the steps of:

additionally collecting metrics for existing service instances in a replacement node;

performing a best-fit analysis between both of said collected and additionally collected metrics and platform metrics for said replacement node;

creating a set of new replacement service instances in said replacement node to co-exist with a portion of said existing service instances in which said set of new replacement service instances and said portion of said existing services instances are computed to be combined in said replacement node; and, displacing others of said existing service instances to other replacement nodes and creating a remaining set of new replacement service instances in said other replacement nodes.

6. The method of claim 3, wherein said creating step comprises the steps of:

additionally collecting metrics for existing service instances in a replacement node;

performing a best-fit analysis between both of said collected and additionally collected metrics and platform metrics for said replacement node, while weighting at least one metric selected from the group consisting of a cost per unit of performance, a cost per unit of resource consumption, revenue per unit of performance, and revenue per unit of resource consumption;

creating a set of new replacement service instances in said replacement node to co-exist with a portion of said existing service instances in which said set of new replacement service instances and said portion of said existing services instances are computed to be combined in said replacement node according to said weighted at least one metric; and, displacing others of said existing service instances to other replacement nodes and creating a remaining set of new replacement service instances in said other replacement nodes.

7. An grid coordinator comprising:

a monitor communicatively linked to a plurality of grid hosts in a services grid;

a metrics store coupled to said monitor and configured to store service metrics for individual service instances in said grid hosts;

optimization logic programmed to compute a best-fit between metrics stored for a set of service instances in a failed grid host, and platform metrics determined for a proposed replacement grid host; and, a failover processor coupled to said monitor and said optimization logic and communicatively linked to said grid hosts to create a new set of service instances in said proposed replacement grid host to replace said set of service instances in said failed grid host according to said best-fit computed in said optimization logic.

8. The grid coordinator of claim 7, wherein said monitor comprises a plurality of cooperative monitoring processes disposed in said grid hosts, each said cooperative monitoring process having a configuration for reporting a state of a corresponding grid host to said failover processor.

9. The grid coordinator of claim 7, wherein said service metrics comprise at least one metric selected from the group consisting of resources consumed in a grid host, a preferred operating system platform, minimum resources required in a grid host, preferred resources available for consumption in a grid host.

10. The grid coordinator of claim 9, wherein said service metrics further comprise at least one metric selected from the group consisting of a cost per unit of performance, a cost per unit of resource consumption, revenue per unit of performance, and revenue per unit of resource consumption.

11. A machine readable storage having stored thereon a computer program for managing autonomic failover, the computer program comprising a routine set of instructions for causing the machine to perform the steps of:

collecting metrics for service instances in a node;

detecting a failure in said node;

upon detecting said failure, locating a set of replacement nodes and determining platform metrics for each of said replacement nodes; and, creating new replacement service instances in selected ones of said replacement nodes based upon said collected metrics and said platform metrics.

12. The machine readable storage of claim 11, wherein said metrics comprise at least one metric selected from the group consisting of resources consumed in a grid host, a preferred operating system platform, minimum resources required in a grid host, preferred resources available for consumption in a grid host.

13. The machine readable storage of claim 12, wherein said metrics further comprise at least one metric selected from the group consisting of a cost per unit of performance, a cost per unit of resource consumption, revenue per unit of performance, and revenue per unit of resource consumption.

14. The machine readable storage of claim 11, wherein said creating step comprises the steps of:

performing a best-fit analysis between said collected metrics and said platform metrics to identify a replacement node in which to create new replacement service instances; and, creating new replacement service instances in said identified replacement node.

15. The machine readable storage of claim 11, wherein said creating step comprises the steps of:

additionally collecting metrics for existing service instances in a replacement node;

performing a best-fit analysis between both of said collected and additionally collected metrics and platform metrics for said replacement node;

creating a set of new replacement service instances in said replacement node to co-exist with a portion of said existing service instances in which said set of new replacement service instances and said portion of said existing services instances are computed to be combined in said replacement node; and, displacing others of said existing service instances to other replacement nodes and creating a remaining set of new replacement service instances in said other replacement nodes.

16. The machine readable storage of claim 13, wherein said creating step comprises the steps of:

additionally collecting metrics for existing service instances in a replacement node;

performing a best-fit analysis between both of said collected and additionally collected metrics and platform metrics for said replacement node, while weighting at least one metric selected from the group consisting of a cost per unit of performance, a cost per unit of resource consumption, revenue per unit of performance, and revenue per unit of resource consumption;

creating a set of new replacement service instances in said replacement node to co-exist with a portion of said existing service instances in which said set of new replacement service instances and said portion of said existing services instances are computed to be combined in said replacement node according to said weighted at least one metric; and, displacing others of said existing service instances to other replacement nodes and creating a remaining set of new replacement service instances in said other replacement nodes.

* * * * *